(12) United States Patent
Park

(10) Patent No.: US 8,477,243 B2
(45) Date of Patent: *Jul. 2, 2013

(54) PROGRAM GUIDE APPARATUS ACQUIRING PROGRAM GUIDE INFORMATION AND/OR PROVIDING FOR PROGRAM GUIDE NAVIGATION USING SAME

(75) Inventor: Ju-ha Park, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/482,593

(22) Filed: May 29, 2012

(65) Prior Publication Data

US 2012/0304226 A1 Nov. 29, 2012

Related U.S. Application Data

(63) Continuation of application No. 10/898,966, filed on Jul. 27, 2004, now abandoned, and a continuation of application No. 09/163,977, filed on Sep. 30, 1998.

(30) Foreign Application Priority Data

Sep. 5, 1998 (KR) ...................................... 98-36628

(51) Int. Cl.
*H04N 5/445* (2011.01)
(52) U.S. Cl.
USPC ............ 348/564; 348/563; 348/569; 348/734
(58) Field of Classification Search
USPC .............. 348/465, 469, 845.2, 563–565, 569, 348/845.1, 473, 476, 460, 464, 734; 725/39–44

IPC ...................................................... H04N 5/445
See application file for complete search history.

(56) References Cited

U.S. PATENT DOCUMENTS

| 4,484,217 A | 11/1984 | Block et al. |
| 5,444,499 A | 8/1995 | Saitoh |

(Continued)

FOREIGN PATENT DOCUMENTS

| JP | 4-77110 | 3/1992 |
| JP | 7-67061 | 3/1992 |

(Continued)

OTHER PUBLICATIONS

Notice of Allowance mailed Feb. 20, 2013 in related U.S. Appl. No. 09/163,977.

(Continued)

*Primary Examiner* — Trang U Tran
(74) *Attorney, Agent, or Firm* — Staas & Halsey LLP

(57) ABSTRACT

A digital television signal receiver, which includes an audio processor to process the audio data to be output as sound; a video processor to process a video data to be output on a screen; a storage to store the extracted program information; a processor to access the storage to generate a channel list based on the stored program information; wherein the channel list comprises at least one main channel number and the at least one main channel number has at least one corresponding sub-channel number in the received transport stream; a user interface to allow a user to navigate the channel list to search a channel number.

3 Claims, 5 Drawing Sheets

U.S. PATENT DOCUMENTS

| | | | |
|---|---|---|---|
| 5,583,889 | A | 12/1996 | Citta et al. |
| 5,585,838 | A | 12/1996 | Lawler et al. |
| 5,625,406 | A | 4/1997 | Newberry et al. |
| 5,659,367 | A | 8/1997 | Yuen |
| 5,699,125 | A | 12/1997 | Rzeszewski et al. |
| 5,737,030 | A | 4/1998 | Hong et al. |
| 5,781,246 | A | 7/1998 | Alten et al. |
| 5,793,438 | A | 8/1998 | Bedard |
| 5,844,620 | A | 12/1998 | Coleman et al. |
| 5,880,768 | A | 3/1999 | Lemmons et al. |
| 5,917,481 | A | 6/1999 | Rzeszewski et al. |
| 5,929,932 | A | 7/1999 | Otsuki et al. |
| 5,946,052 | A | 8/1999 | Ozkan et al. |
| 6,020,930 | A | 2/2000 | Legrand |
| 6,025,837 | A | 2/2000 | Matthews, III et al. |
| 6,031,577 | A | 2/2000 | Ozkan et al. |
| 6,034,677 | A | 3/2000 | Noguchi et al. |
| 6,078,348 | A | 6/2000 | Klosterman et al. |
| 6,111,611 | A * | 8/2000 | Ozkan et al. ............... 348/465 |
| 6,212,680 | B1 | 4/2001 | Tsinberg et al. |
| 6,216,265 | B1 | 4/2001 | Roop et al. |
| 6,243,142 | B1 | 6/2001 | Mugura et al. |
| 6,249,320 | B1 | 6/2001 | Schneidewend et al. |
| 6,337,719 | B1 | 1/2002 | Cuccia |
| 6,341,195 | B1 | 1/2002 | Mankovitz et al. |
| 6,405,372 | B1 | 6/2002 | Kim et al. |
| 6,418,556 | B1 | 7/2002 | Bennington et al. |
| 6,421,828 | B1 | 7/2002 | Wakisaka et al. |
| 6,452,644 | B1 | 9/2002 | Shimakawa et al. |
| 6,483,547 | B1 | 11/2002 | Eyer |
| 6,763,522 | B1 * | 7/2004 | Kondo et al. ............... 725/39 |
| 7,051,353 | B2 | 5/2006 | Yamashita et al. |
| 2003/0090585 | A1 | 5/2003 | Anderson |

FOREIGN PATENT DOCUMENTS

| | | |
|---|---|---|
| JP | 4-355583 | 12/1992 |
| JP | 05-252492 | 9/1993 |
| JP | 6-311444 | 11/1994 |
| JP | 07-303216 | 11/1995 |
| JP | 09-083888 | 3/1997 |
| JP | 9-331484 | 12/1997 |
| JP | 10-13756 | 1/1998 |
| JP | 10-013758 | 1/1998 |
| JP | 10-84513 | 3/1998 |
| JP | 10-108144 | 4/1998 |
| JP | 10-112825 | 4/1998 |
| JP | 10-150642 | 6/1998 |
| JP | 10-178621 | 6/1998 |
| WO | WO 96/07270 A1 | 3/1996 |
| WO | WO 97/30552 | 8/1997 |

OTHER PUBLICATIONS

Korean Non-Final Rejection dated Aug. 31, 2005 in Korean Application No. 10-1998-0036628.

Decision of Rejection dated Jan. 15, 2013 in Japanese Patent Application No. 2010-010019.

Final Rejection dated Jan. 9, 2013 in Japanese Patent Application No. 2010-010019.

U.S. Appl. No. 09/163,977, filed Sep. 30, 1998, Ju-Ha Park, Samsung Electronics Co., Ltd.

U.S. Appl. No. 13/617,918, filed Sep. 14, 2012, Ju-Ha Park, Samsung Electronics Co., Ltd.

U.S. Appl. No. 12/822,878, filed Jun. 24, 2010, Ju-Ha Park, Samsung Electronics Co., Ltd.

U.S. Appl. No. 12/834,436, filed Jun. 12, 2010, Ju-Ha Park, Samsung Electronics Co., Ltd.

Japanese Office Action dated Feb. 14, 2012 issued in corresponding Japanese Patent Application No. 2010-10019.

Japanese Office Action issued on Dec. 7, 2004 in corresponding Japanese Application No. 2003-11056.

Japanese Office Action issued on May 9, 2006 in corresponding Japanese Application No. 2003-11056.

U.S. Patent Office Action dated Mar. 17, 2000, issued in corresponding U.S. Appl. No. 09/163,977.

U.S. Patent Office Action dated Aug. 29, 2000, issued in corresponding U.S. Appl. No. 09/163,977.

U.S. Patent Advisory Action dated Jan. 17, 2001, issue din corresponding U.S. Appl. No. 09/163,977.

U.S. Patent Office Action dated Feb. 13, 2001, issued in corresponding U.S. Appl. No. 09/163,977.

U.S. Patent Office Action dated Jun. 6, 2001, issued in corresponding U.S. Appl. No. 09/163,977.

U.S. Patent Office Action dated Jul. 30, 2002, issued in corresponding U.S. Appl. No. 09/163,977.

U.S. Patent Office Action dated Jan. 15, 2003, issued in corresponding U.S. Appl. No. 09/163,977.

U.S. Patent Office Action dated Jul. 1, 2003, issued in corresponding U.S. Appl. No. 09/163,977.

U.S. Patent Advisory Action dated Oct. 21, 2003, issued in corresponding U.S. Appl. No. 09/163,977.

U.S. Patent Office Action dated Dec. 5, 2003, issued in corresponding U.S. Appl. No. 09/163,977.

U.S. Patent Office Action dated May 19, 2004, issued in corresponding U.S. Appl. No. 09/163,977.

U.S. Patent Advisory Action dated Nov. 3, 2004, issued in corresponding U.S. Appl. No. 09/163,977.

U.S. Patent Office Action dated Feb. 25, 2005, issued in corresponding U.S. Appl. No. 09/163,977.

U.S. Patent Office Action dated Aug. 10, 2005, issued in corresponding U.S. Appl. No. 09/163,977.

U.S. Patent Advisory Action dated Nov. 29, 2005, issued in corresponding U.S. Appl. No. 09/163,977.

U.S. Patent Office Action dated Jan. 12, 2006, issued in corresponding U.S. Appl. No. 09/163,977.

U.S. Patent Office Action dated Jun. 14, 2006, issued in corresponding U.S. Appl. No. 09/163,977.

U.S. Patent Advisory Action dated Sep. 26, 2006, issued in corresponding U.S. Appl. No. 09/163,977.

U.S. Patent Office Action dated Dec. 28, 2006, issued in corresponding U.S. Appl. No. 09/163,977.

U.S. Office Action dated Jun. 20, 2007, issued in corresponding U.S. Appl. No. 09/163,977.

U.S. Patent Advisory Action dated Sep. 4, 2007, issued in corresponding U.S. Appl. No. 09/163,977.

U.S. Patent Office Action Oct. 31, 2007, issued in corresponding U.S. Appl. No. 09/163,977.

U.S. Office Action dated May 1, 2008, issued in corresponding U.S. Appl. No. 09/163,977.

U.S. Patent Interview Summary dated Jul. 14, 2008, issued in corresponding U.S. Appl. No. 09/163,977.

U.S. Patent Advisory Action dated Jul. 17, 2008, issued in corresponding U.S Appl. No. 09/163,977.

U.S. Patent Office Action dated Oct. 16, 2008, issued in corresponding U.S. Appl. No. 09/163,977.

U.S. Patent Office Action dated Apr. 16, 2009, issued in corresponding U.S. Appl. No. 09/163,977.

U.S. Patent Advisory Action dated Jul. 6, 2009, issued in corresponding U.S. Appl. No. 09/163,977.

U.S. Patent Office Action dated Oct. 1, 2009, issued in corresponding U.S. Appl. No. 09/163,977.

U.S. Patent Office Action dated Mar. 19, 2010, issued in corresponding U.S. Appl. No. 09/163,977.

U.S. Patent Advisory Action dated Jun. 16, 2010, issued in corresponding U.S. Appl. No. 09/163,977.

U.S. Office Action mailed Jul. 21, 2010 in related U.S. Appl. No. 09/163,977.

Advisory Action mailed Nov. 16, 2011 in parent U.S. Appl. No. 09/163,977.

U.S. Office Action mailed Nov. 14, 2012 in corresponding U.S. Appl. No. 09/163,977.

U.S. Office Action mailed Oct. 11, 2012 in parent U.S. Appl. No. 09/163,977.

U.S. Office Action dated Apr. 13, 2011, issued in the file history of U.S. Appl. No. 09/163,977.

U.S. Office Action dated Jul. 19, 2011, issued in the file history of U.S. Appl. No. 09/163,977.

U.S. Office Action dated Feb. 24, 2009, issued in corresponding U.S. Appl. No. 10/898,966.
U.S. Patent Office Action dated Sep. 1, 2009, issued in corresponding U.S. Appl. No. 10/898,966.
U.S. Patent Advisory Action dated Nov. 20, 2009, issued in corresponding U.S. Appl. No. 10/898,966.
U.S. Patent Office Action dated Jan. 6, 2010, issued in corresponding U.S. Appl. No. 10/898,966.
U.S. Patent Advisory Action dated Mar. 23, 2010, issued in corresponding U.S. Appl. No. 10/898,966.
U.S. Patent Office Action dated May 26, 2010, issued in corresponding U.S. Appl. No. 10/898,966.
U.S. Patent Office Action dated Dec. 9, 2010, issued in corresponding U.S. Appl. No. 12/898,966.
U.S. Office Action dated Jul. 18, 2011, issued in the file history of U.S. Appl. No. 10/898,966.
U.S. Patent Final Office Action mailed Jan. 26, 2012 in U.S. Appl. No. 10/898,966.
U.S. Patent Office Action dated Sep. 9, 2010, issued in corresponding U.S. Appl. No. 12/22,878.
U.S. Patent Office Action Interview Summary dated Sep. 22, 2010, issued in corresponding U.S. Appl. No. 12/822,878.
U.S. Office Action mailed Oct. 28, 2010 in co-pending U.S. Appl. No. 12/822,878.
Office Action mailed Nov. 26, 2010 in co-pending U.S. Appl. No. 12/822,878.
U.S. Patent Office Action mailed Apr. 28, 2011 in co-pending U.S. Appl. No. 12/822,878.
U.S. Final Office Action mailed Jun. 14, 2011 in co-pending U.S. Appl. No. 12/822,878.
Office Action mailed Feb. 27, 2012 in co-pending U.S. Appl. No. 12/822,878.
U.S. Notice of Allowance mailed Sep. 14, 2012 in corresponding U.S. Appl. No. 12/822,878.
U.S. Office Action mailed Sep. 9, 2010 and issued in related U.S. Appl. No. 12/834,436.
U.S. Office Action mailed Feb. 1, 2011 and issued in related U.S. Appl. No. 12/834,436.
U.S. Patent Interview Summary mailed Apr. 19, 2011 in co-pending U.S. Appl. No. 12/834,436.
U.S. Patent Advisory Action mailed May 3, 2011 in co-pending U.S. Appl. No. 12/834,436.
U.S. Patent Office Action mailed Sep. 12, 2011 in co-pending U.S. Appl. No. 12/834,436.
U.S. Final Office Action mailed Dec. 20, 2011 in U.S. Appl. No. 12/834,436.
Notice of Allowance mailed Aug. 30, 2012 in corresponding U.S Appl. No. 12/834,436.
U.S. Notice of Allowance mailed Dec. 11, 2012 in corresponding U.S. Appl. No. 12/834,436.
Notice of Allowance mailed Apr. 30, 2013 in related U.S. Appl. No. 13/759,531.
Office Action mailed Apr. 18, 2013 in related U.S. Appl. No. 13/759,520.
Notice of Allowance mailed Apr. 25, 2013 in related U.S. Appl. No. 13/759,556.
Office Action mailed Apr. 29, 2013 in related U.S. Appl. No. 13/482,593.

* cited by examiner

PROGRAM GUIDE APPARATUS ACQUIRING PROGRAM GUIDE INFORMATION AND/OR PROVIDING FOR PROGRAM GUIDE NAVIGATION USING SAME

CROSS-REFERENCE TO RELATED APPLICATION

This application is a continuation application of Ser. No. 10/898,966, filed Jul. 27, 2004, which is now pending, and application Ser. No. 09/163,977, filed Sep. 30, 1998, which is now pending. This application claims the benefit of Korean Application No. 98-36628, filed Sep. 5, 1998, in the Korean Industrial Property Office, the disclosure of which is incorporated herein by reference.

BACKGROUND OF THE INVENTION

1. Field of the Invention

The present invention relates to a method of acquiring program guide information in an image signal receiving apparatus, and to a method and apparatus for guiding a program using the same.

2. Description of the Related Art

Generally, program information of a conventional analog TV broadcast is supplied to publications such as newspapers, TVs, magazines, etc. However, in a digital multichannel broadcast, tens to hundreds of channels are provided, so that a total number of the selections available to viewers becomes larger and simultaneously program selection is significantly complicated.

In such a digital broadcast, an electronic program guide (EPG) providing a program list or information on the content of each program is introduced as a fundamental data service.

Current EPG information is transmitted per channel. That is, since the EPG information of a corresponding channel is transmitted per channel, it is difficult to obtain the EPG information of all channels capable-of being accessed.

To be more specific, the EPG information of a current received channel can be obtained by interpreting additional information included in a transport packet received. However, in order to acquire EPG information of all channels capable of being accessed, a user must tune all channels individually.

In the digital broadcast, many more channels are provided than in the analog broadcast, and each channel can include subchannels. Therefore, it is important to swiftly interface the EPG information of each channel to a user.

SUMMARY OF THE INVENTION

To solve the above problems, it is an object of the present invention to provide a method of acquiring useful EPG information.

It is another object of the present invention to provide a program guide method appropriate for the above method.

It is still another object of the present invention to provide a program guide apparatus appropriate for the above method.

Accordingly, to achieve the first object, there is provided a method of acquiring program guide information for channels wherein the program guide information for each channel is acquired by scanning accessible channels while a received program is not displayed.

To achieve the second object, there is provided a program guiding method in which a program list for channels is displayed in response to a program guide command. The program guiding method comprises the steps of acquiring program guide information of accessible channels, storing the acquired program guide information, writing a program list on the basis of the stored program guide information, and displaying the written program list to the user.

Also to achieve the second object, the step of acquiring the program guide information comprises the steps of writing and displaying a program list including program guide information of channels tuned before a program guide command is executed, from the stored program guide information, and acquiring program guide information for each channel by searching for accessible channels in a background operation while the program list is referred to.

To achieve the third object, there is provided an apparatus for acquiring the program guide information of accessible channels and guiding program guide information acquired in response to a program guide command in a multichannel receiver. The apparatus comprises a tuner tuning a channel, a program guide information detector, a memory, a key input, a microprocessor, and a character signal generator.

The program guide information detector detects program guide information introduced via the tuner. The memory stores the program guide information for each channel detected by the program guide information detector. The key input introduces a user manipulation command such as a program guide command or a channel search command. The microprocessor writes a program list based on program guide information stored in the memory in response to the manipulation command input via the key input and is programmed to search for accessible channels by controlling the tuner in a background operation while a user refers to the program list. The character signal generator generates a character signal corresponding to the program list written by the microprocessor and provides the character signal to a screen.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Channel numbers, channel names, program names schedules, etc., generally transmitted as data are displayed on a TV screen as a program list having a time axis and a channel axis by EPG software of a receiver. A user can perform operations such as tuning or programming in the program list by manipulating a cursor.

Figure 1:
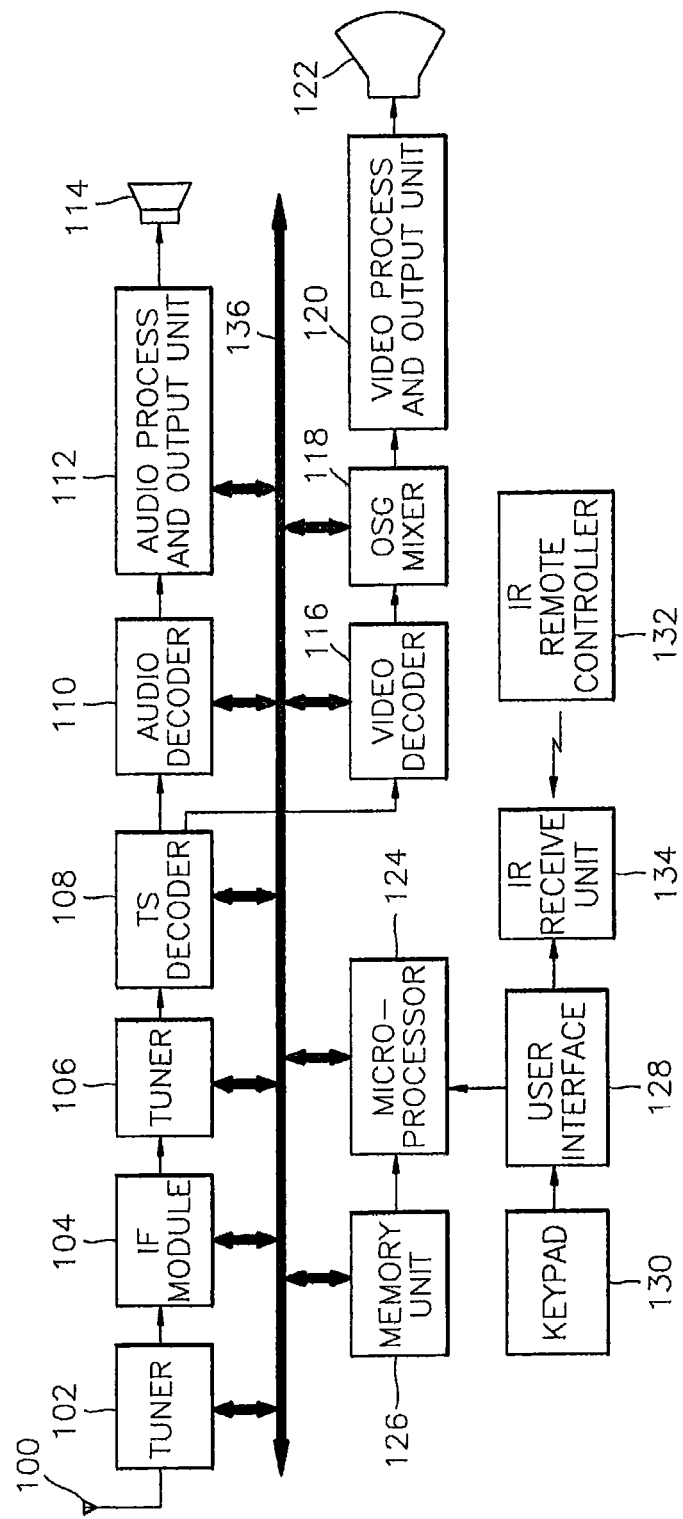
FIG. 1 is a block diagram illustrating the configuration of a general DTV receiver.

FIG. 1 is a block diagram showing the configuration of a conventional digital multichannel TV (hereinafter, called "DTV") receiver (which is also used in the present invention, as explained with reference to FIG. 2). In FIG. 1, a tuner 102 tunes a radio frequency (RF) channel from received broadcast signals via an antenna 100 under the control of a microprocessor 124. The tuner 102 outputs an intermediate frequency (IF) signal of the tuned channel, and an IF module 104 outputs a baseband signal of the tuned channel to a channel decoder 106.

The channel decoder 106 channel-decodes the baseband signal received from the IF module 104 and reproduces data bit lines. Each of the reproduced data bit lines is divided into audio data, video data, and additional data by a transport stream (TS) decoder 108.

The audio data is transmitted to an audio decoder 110 and decoded according to an MPEG standard or dolby AC-3 standard by the audio decoder 110. The audio data is processed by an audio processing and output unit 112 and output as sound through a speaker 114.

The video data is transmitted to a video decoder 116, decoded according to the MPEG standard, applied to an on-screen-display (OSD) mixer 118, mixed with OSD data generated by the, microprocessor 124, processed by a video processing and outputting unit 120, and output on the screen of a picture tube 122. Here the OSD data is used for the microprocessor 124 to display various information as graphics or text on a screen.

The additional data is transmitted to the microprocessor 124. The microprocessor 124 extracts program guide information or other information and stores the extracted information in a memory unit 126. Typical EPG information is stored in a nonvolatile memory such as an EEPROM or a flash ROM.

A key pad 130 and an infra red (IF) receiving unit 134 are connected to the microprocessor 124, which is a control unit of a DTV receiver, via a user interface 128. The microprocessor 124 performs operations depending on various operation commands received from an IR remote controller 132 via the keypad 130 and the IR receiving unit 134, according to a program stored in the memory 126. Here, the IR remote controller 132 can be a wireless mouse such as an air mouse, a remote controller, etc.

A command from the IR remote controller is received as an IR signal by the IR receiving unit 134, and transmitted to the microprocessor 124 via the user interface 128. Also, the additional data from the TS decoder 108 is transmitted to the microprocessor 124. Here, the additional data includes program specific information (PSI) organized as a table with respect to program associated information prescribed in MPEG-2, and the aforementioned EPG information.

The memory unit 126 includes a ROM for storing the program of the microprocessor 124, a RAM for temporarily storing data created during the program execution in the microprocessor 124, and an electrically erasable and programmable ROM (EEPROM) for storing various reference data.

The microprocessor 124 is connected via a bus 136 to the tuner 102, the IF module 104, the channel decoder 106, the TS decoder 108, the audio decoder 110, the audio processing and outputting unit 112, the video decoder 116, the OSD mixer 118, the video process and output unit 120, and the memory unit 126.

In the apparatus shown in FIG. 1, while a user selects and receives a channel, the microprocessor 124 detects the EPG information from the additional data provided by the TS decoder 108. The EPG information of a corresponding channel is stored in the memory unit 126, and provided to a user in a program guide mode.

Since the EPG information is transmitted separately for each channel, the EPG information of a corresponding channel cannot be acquired if that channel is not tuned.

Thus, a program list for all channels cannot be provided in the program guide mode for guiding a program list for each channel to a user, in the conventional apparatus.

In the present invention, while a program of a channel tuned by the tuner 102 is not displayed, for example, while a user selects or programs a program with reference to EPG information displayed on a screen or views line input, an accessible channel is scanned in a background operation, to obtain the EPG information.

Figure 2:
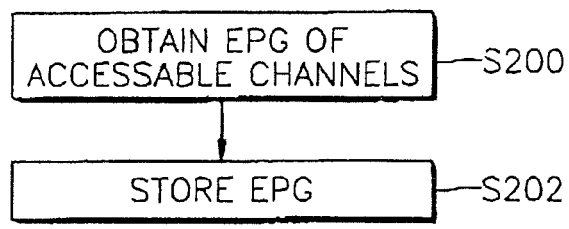
FIG. 2 is a flowchart illustrating a method of acquiring program guide information, according to the present invention.

FIG. 2 is a flowchart showing a method of obtaining program guide information according to the present invention. FIG. 2 shows an example of obtaining EPG information in a program guide mode according to the present invention, using the conventional apparatus showing FIG. 1.

When a program guide command is input from a user via the keypad 130, the apparatus shown in FIG. 1 enters into a program guide mode. In the program guide mode, first, all channels capable of being accessed by the tuner 102 are scanned to obtain program guide information for each channel, in step S200. The microprocessor 124 controls the tuner 102 to scan as many channels as possible, and detects the program guide information for each channel from additional data introduced via the tuner 102. Here, the accessible channels include not only the channels capable of being accessed by the tuner 102 but also line input.

Obtained EPG information is stored, in step S202.

The obtained EPG information is stored in the memory unit 126. The EPG information is transmitted for each channel, so that the microprocessor 124 acquires EPG information of a corresponding channel whenever a channel is changed and stores the acquired EPG information to the memory unit 126.

According to the method of FIG. 2, when the program guide mode begins, program guide information with respect to all the accessible channels is acquired all at once in an initial stage. Thus, much time is required to display the program guide information.

An increase in the number of accessible channels requires a longer time to display the program guide information, and causes the user inconvenience. In particular, a digital broadcast provides tens or hundreds of channels, thus requiring a lot of time to acquire the EPG information of all channels.

To solve this problem, in the present invention, the EPG information of a prior channel among prioritized channels is first obtained, and the EPG information of a channel having the lowest priority is then obtained, thus accomplishing a smooth user interface.

The priority of the channel search is determined by the distance (interval) of the channels to the channel tuned before a program guide command is executed, or by a probability distribution of channels, i.e., the accumulation of the number of times which channels are selected.

A typical user searches using a channel up/down command, so it is natural for the user to search beginning with channels included in a currently-displayed program list and their closest channels.

Here, the closest channels include upper closest channels and lower closest channels, and it is preferable to determine by default which channel among the above closest channels is to be accessed first.

Also, it is necessary to change the direction of search according to the characteristics of a user, even if the search direction is determined by default. For example, even if the default search direction is set to be upward, once the user designates a channel down button, lower channels must be preferentially searched. It is preferable that in preparation for when a user changes the search direction in the middle of a search, a channel search direction is determined referring to a channel up/down command or page up/down command received just before determining a channel search.

Figure 3:
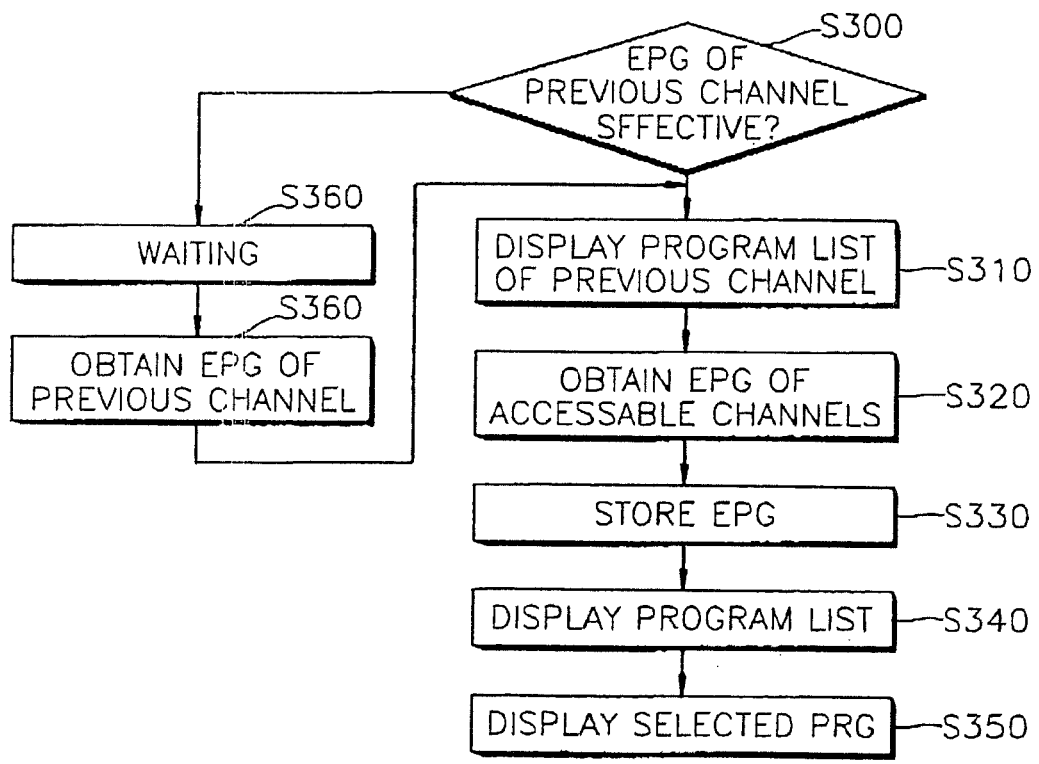
FIG. 3 is a flowchart illustrating a program guide method according to the present invention.

FIG. 3 is a flowchart illustrating a program guide method according to a preferred embodiment of the present invention. Response must be preferentially considered in the interface with a user. It is considered that a good response is provided if a system quickly responds to a command input by a user. The response is not considered good if a user must wait until program guide information for all channels is obtained after inputting the program guide command.

However, the user immediately needs program guide information of a channel viewed before the program guide command is executed, and program guide information of several channels adjacent to the channel viewed, not the program guide information for all channels.

In the present invention, the channel viewed before the program guide command is executed, and the program guide information of several channels adjacent to the above channel are first acquired and displayed to the user, thus improving the response.

Also, channels adjacent to channels displayed in preparation for the channel search by a user are first searched, and farther channels are then gradually searched, thus obtaining the program guide information of accessible channels.

Referring to FIG. 3, first, it is detected whether program guide information of a channel tuned before a program guide command is executed is effective, in step S300. Generally, a user executes a program guide command while receiving the program of a channel. The EPG information of a channel is automatically obtained while that channel is tuned, so that at least the program guide information of the channel tuned before the program guide command is executed can be considered effective.

In a display step S310, at least a program list of channels tuned before the program guide command is executed among stored EPG information is displayed. The microprocessor 124 writes a program list including channels tuned before the program guide command is executed among EPG information stored in the memory unit 126, and provides the program list to the OSG mixer 118. The OSG mixer 118 converts the program list provided by the microprocessor 124 into a character signal, and displays the character signal on a screen.

Figure 4A:
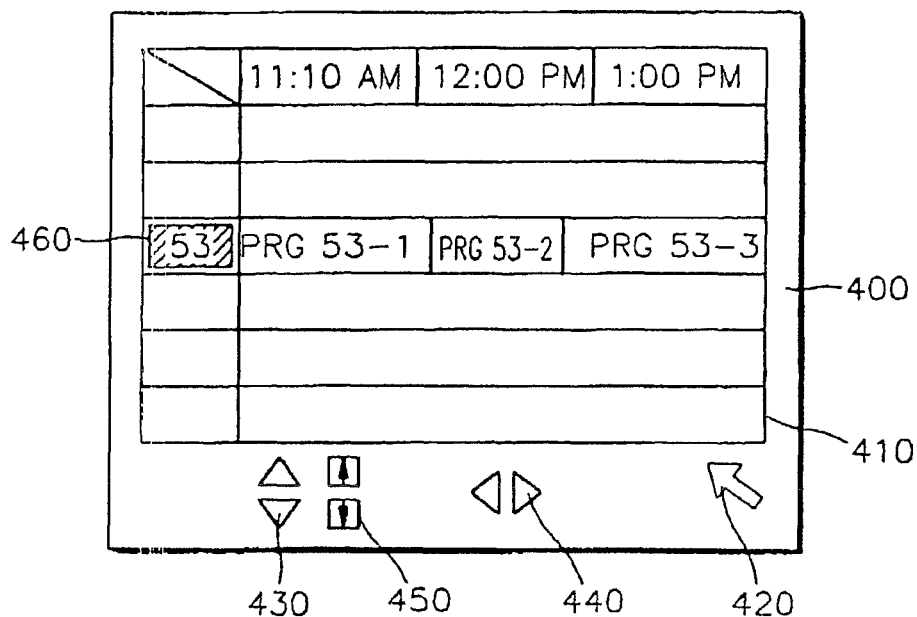
FIGS. 4A through 4C show a program list displayed on a screen in the method shown in FIG. 3.

FIG. 4A shows the contents displayed on a screen as the result of the step S310. In FIG. 4A, reference numeral 400 is a screen, reference numeral 410 is a program list, reference numeral 420 is a cursor, reference numeral 430 is an up/down button, reference numeral 450 is a page up/down button, and reference numeral 440 is a left/right scan button.

The program list 410 lists a program for each channel on channel and time axes. Channels listed in the program list 410 are controlled by the up/down button 430, and time is controlled by the left/right scan button 440.

A user can search for a channel and time of a desired program, using the up/down button 430 and the left/right scan button 440.

Whenever the up/down button 430 is pressed, a selection bar 460 moves between the listed channels. When the selection bar 460 departs from a screen boundary, the content of the program list 410 is renewed so that the next adjacent channel can be displayed.

If program guide information of channels tuned before the program guide command is executed is not effective or not stored, a screen display message like "please wait" or "obtaining program guide information" is displayed to the user, in step S360. If it takes a short time to obtain the program guide information of the tuned channel, this message display step may be omitted.

Then, program guide information of channels tuned before a program guide command is executed is obtained, in step S370. A program list including this program guide information is displayed, in step 310.

In a program guide information acquiring step S320, program guide information for each channel is obtained by scanning accessible channels via the tuner 102 while a user views displayed EPG information.

To be more specific, in the program list shown in FIG. 4, an inverted channel number in a program list 410 of a channel No. 53 indicates that channel No. 53 was viewed before a program guide mode.

Figure 4B:
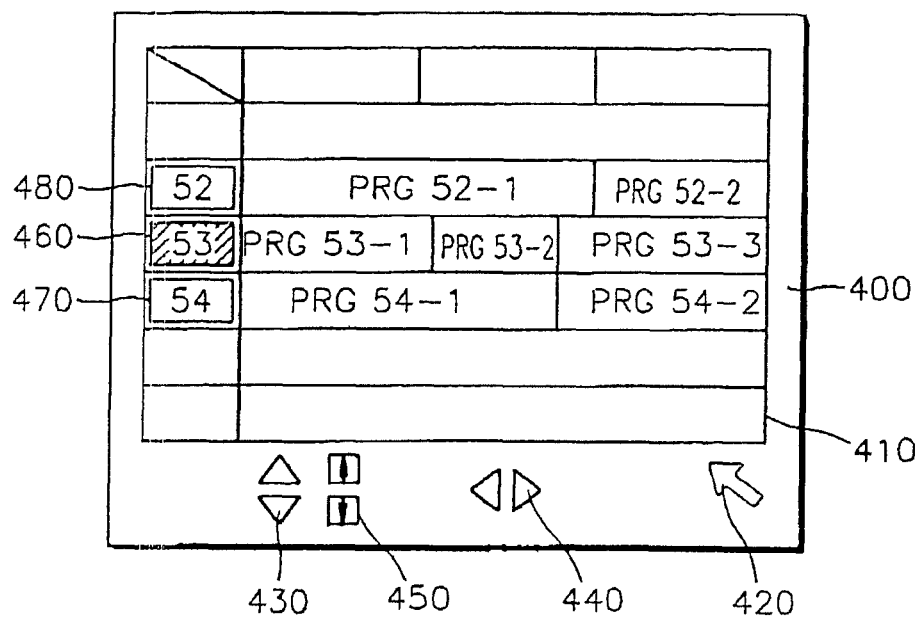

In the circumstances where the program list as shown in FIG. 4B is displayed, channels are searched to obtain EPG information, in the following sequence.

If a channel No. 52 is in an upper adjacent screen boundary 480 and a channel No. 54 are channels listed closest to a channel No. 53, i.e., channels most adjacent, they have the highest preference.

If a channel No. 51 is in an upper adjacent screen boundary 480 and a channel No. 56 is in a lower adjacent screen boundary 470 are channels listed next closest to the channel No. 53, they have the next highest preferences after the channels No. 52 and No. 54.

If an upward search direction is determined by default, channels are searched for in the sequence of No. 53, to No. 52, to No. 54, No. 51, and No. 56. In this instance, an upward search is conducted prior to a search in the downward direction. That is, a search is alternatingly executed in an upward direction and a downward direction with the upward search being executed first.

Figure 4C:
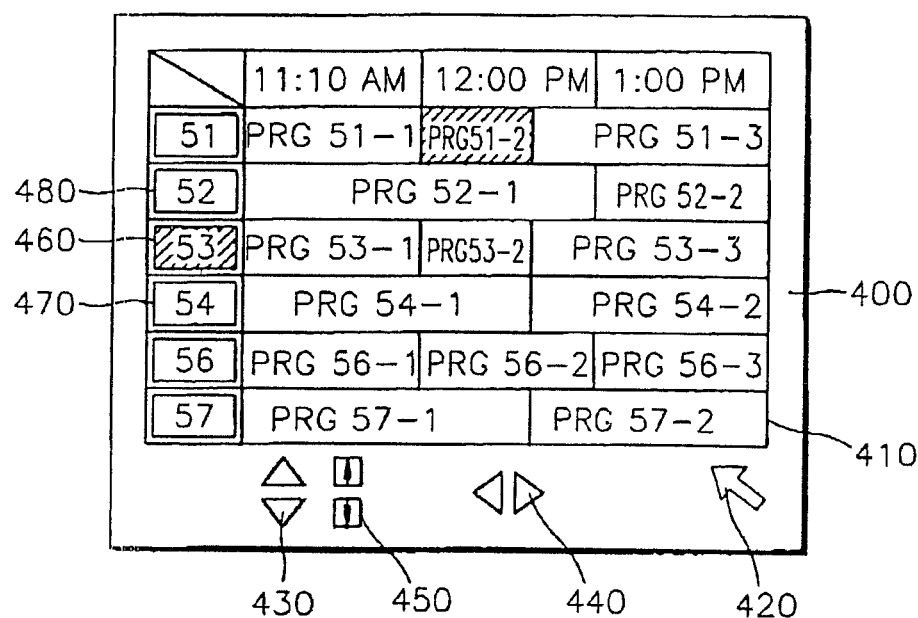

EPG information for each channel is stored in the memory unit 126 as soon as it is obtained, and the microprocessor 124 writes a new program list referring to this information and provides the new program to the OSG mixer 118, in steps S330 and S340. As a result, new program lists as shown in FIGS. 4B and 4C are sequentially displayed.

The sequence in which the EPG information is listed in the memory unit 126 is determined by a typical channel number. Also, when a channel has subchannels, the subchannels are listed after the main channel.

Accordingly, the microprocessor 124 already knows the listing sequence of the EPG information stored in the memory unit 126, and also knows the channel viewed before the program guide mode, to determine one search sequence.

The sequence for searching for channels may not be determined according to adjacency (or proximity). For example, channels may be searched for upward or downward based on the channel viewed before the program guide mode. However, considering the response to the user, it is more proper that the channel search sequence be determined according to the adjacency between channels instead of just to those closest to the channels shown in adjacent screen boundaries 470 and 480.

The channel search sequence may be changed by the search preference of a user. For example, if a user manipulates the channel up/down button 430 referring to a screen shown in FIG. 4C, a continuous search in a direction to be indicated later can be expected. Thus, when a channel up operation is indicated, the channel search operation may be limited to upper channels instead of just to those closest to the channel shown in adjacent screen boundaries 470 and 480.

The channel search sequence can be determined referring to past viewing tendencies of users. This determines the probability that a channel is to be tuned based on the accumulated frequency of channels tuned by a user. A channel having a higher probability is searched for earlier.

In a storing step S330 of FIG. 3, the obtained EPG information is stored in the memory unit 126. Here, the obtained program guide information can be renewed only when there is a difference between the obtained program guide information and program guide information stored in the memory unit 126.

The obtained EPG information is stored in the memory unit 126. Since the EPG information is transmitted by channels, the microprocessor 124 acquires EPG information of a corresponding channel whenever a channel is changed, and stores the acquired EPG information in the memory unit 126.

A program list is displayed, in step S340.

The microprocessor 124 accesses the program guide information stored in the memory unit 126 to generate the program list as shown in FIGS. 4A through 4C. The program list generated by the microprocessor 124 is displayed on a screen via the OSG mixer 118.

The program list is controlled according to a channel up/down command or page up/down command from a user, and when a channel selection command is applied by the user, the program of a selected channel is displayed, in step S350.

According to the program guiding method of the present invention, the longer it takes for a user to refer to the program list, the program guide information of more channels can be obtained. However, the program guide information of channels immediately required by a user can be sufficiently acquired even in a short searching time.

According to the method shown in FIG. 3, while a program is selected referring to the EPG information displayed by a user, accessible channels are scanned in a background operation unnoticeable to a user, thus obtaining the EPG information. Also, the EPG information is obtained referring to the search direction of a user, thus accomplishing a smooth interface with the user.

Furthermore, in order to obtain the program guide information, the program guide information of a preferential channel is obtained first and provided to a user. Therefore, a user does not need to wait until the program guide information of all the channels is obtained, increasing convenience.

In the program guide method shown in FIG. 3, the program list as shown in FIG. 4C may be displayed in the display step S310. This is the case when a program list including a channel viewed before and channels adjacent to the channel is displayed in the initial stage of a program guiding operation.

According to an advanced television standard committee (ATSC) standard, the EPG information is recommended to be transmitted in a quantity of at least 3 hours to a maximum of 584 hours, at time intervals of 3 hours. Thus, erroneous program guide information is less likely to be displayed if a program guide command is performed within 384 hours at maximum.

Accordingly, it is acceptable to display the program list including a channel viewed before the program guide mode and several channels adjacent to the channel.

However, a program may be changed by the circumstances of a broadcasting station, or unstored program guide information may be requested. Thus, it is preferable that channels are searched for by the above-described searching method even after the program list including the channel viewed before the program guide mode and several channels adjacent to the channel is displayed, to again obtain a program guide.

Meanwhile, when the program list including the channel viewed before the program guide mode and several channels adjacent to that channel is displayed in the initial stage of the program guide operation, possible erroneous information of some channels can be replaced with correct information by searching for channels using the aforementioned search method.

Figure 5:
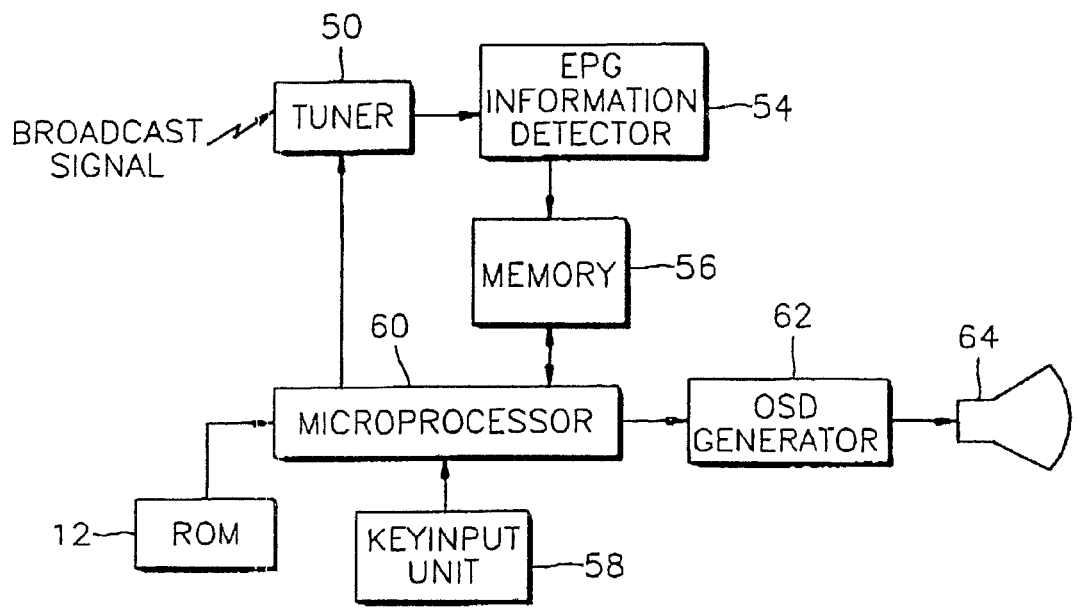
FIG. 5 is a block diagram illustrating an embodiment of a program guide apparatus according to the present invention.

FIG. 5 is a block diagram illustrating the configuration of a program guide apparatus according to the present invention. As shown in FIG. 5, the apparatus includes a tuner 50, a ROM 52, a program guide information detector 54, a memory 56, a key input unit 58, a microprocessor 60, and an OSD generator 62.

The tuner 50 is tuned to a broadcast signal of a tuned channel. The program guide information detector 54 detects EPG information from the broadcast signal of a channel tuned by the tuner 50. The detected EPG information is stored in the memory 56.

The microprocessor 60 writes a program list from the EPG information stored in the memory 56 according to a program stored in the ROM 52, and provides the program list. to the OSD generator 62. The OSD generator 62 converts the program list written from the EPG information stored in the memory 56 into a character signal to display the program list to a CRT 64.

The microprocessor 60 controls tuning of the tuner 50 in the background operation while the program list is displayed on the CRT 64, i.e., while the viewer does not watch any broadcast program via the tuner, to obtain EPG information of the accessible channels.

The microprocessor 60 searches for channels in a programmed channel searching sequence. This channel searching sequence depends on the sequence of channels which are displayed in the program guide mode.

When the channel up/down command is input via the key input unit 58 during channel search, the microprocessor 60 changes the channel searching sequence referring to the, input channel up/down command.

When the EPG information is not stored in the memory 56, the microprocessor 60 generates a message of "please wait" or "acquiring guide information". When at least a current channel and current program guide information are obtained, the microprocessor 60 generates a program list corresponding, to the stored program guide information.

Figure 6:
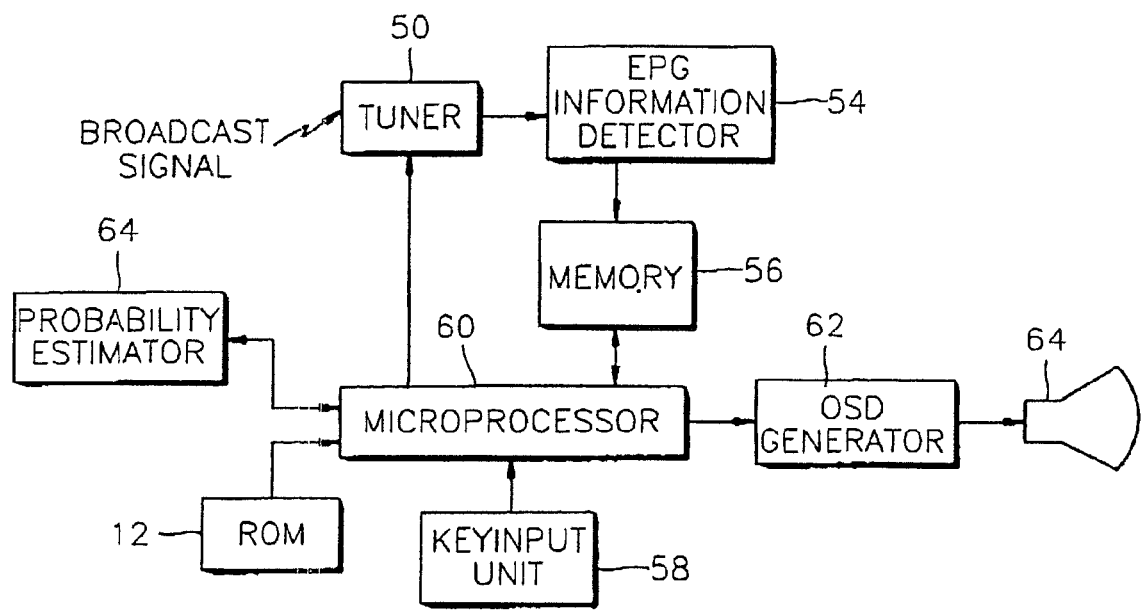
FIG. 6 is a block diagram illustrating another embodiment of a program guide apparatus according to the present invention.

FIG. 6 is a block diagram illustrating another embodiment of a program guide apparatus according to the present invention. Units shown in FIG. 6 performing the same operations as those in FIG. 5 are referred to by the same reference numerals, and will not be described again. The apparatus of FIG. 6 further comprises a probability estimator 64 in addition to the components of the apparatus of FIG. 5.

The probability estimator 64 accumulates the number of times channels are tuned (or selected) by a user, and calculates the probability that each channel will be selected, according to the accumulated value. It can be estimated that the probability of selecting a channel is high as a channel is selected more often.

The microprocessor 124 determines the order of priority of channel search according to the probability calculated by the probability estimator 64.

In the program guide information acquiring method according to the present invention as described above, while a viewer does not watch the program of any channel tuned in a tuner, program guide information of accessible channels is obtained in a background operation. Therefore, the program guide information of the accessible channels can be obtained by only a single tuner.

Furthermore, in the program guide method and apparatus according to the present invention, information immediately required by a user is obtained first, and information of less preferential channels is obtained next, thus smoothing the interface with the user.

What is claimed is:

1. A digital television signal receiver, comprising:
a converter to convert a received radio frequency (RF) digital broadcast signal into a baseband signal;
a decoder to decode the converted baseband signal to reconstruct a digital broadcast transport stream which includes audio data, video data, and program information;
an extractor to extract the audio data, the video data, and the program information from the reconstructed digital broadcast transport stream and storing the extracted program information in a storage of the digital television receiver;
an audio processor to process the extracted audio data to be output as sound;
a video processor to process the extracted video data to be output on a screen;
a processor to access the storage to generate a channel list based on the stored program information, wherein the channel list is made up of one or more separately identifiable channel groupings, each having one or more two-part channel numbers, where each of the one or more two-part channel numbers includes a main channel number as a first part and a sub-channel number as a second part, and where each two-part channel number of a respectively identified channel grouping has a same main channel number and different sub-channel numbers; and
a user interface to enable a user to navigate the channel list to search a two part channel number, wherein information included in the channel list is derived from program associated information from a Program Specific Information (PSI) table, for plural programs included in the transport stream conforming with an MPEG standard, wherein an identifiable program according to the MPEG standard is distinguished from a predetermined corresponding two-part channel number,
wherein the channel list is configured to be navigable in a first direction between one or more two-part channel numbers of a first channel grouping, and navigable in a second direction between the first channel grouping and the second channel grouping, and
wherein the first direction is different from the second direction.

2. The digital television signal receiver of claim 1, wherein the PSI table is a received PSI table conforming with the MPEG standard.

3. The digital television signal receiver of claim 2, wherein a processor generates the channel list so as to be shown in a single display window and the navigation of the channel list is enabled to be performed in a two-dimensional number-based order on the single display window, with the window being vertically and horizontally embedded with two-part channel numbers.

* * * * *

UNITED STATES PATENT AND TRADEMARK OFFICE
CERTIFICATE OF CORRECTION

| | | |
|---|---|---|
| PATENT NO. | : 8,477,243 B2 | Page 1 of 1 |
| APPLICATION NO. | : 13/482593 | |
| DATED | : July 2, 2013 | |
| INVENTOR(S) | : Ju-ha Park | |

It is certified that error appears in the above-identified patent and that said Letters Patent is hereby corrected as shown below:

On the Title Page

Column 1, Item [54] and in the Specification, Column 1 (Title), Delete "PROGRAM GUIDE APPARATUS ACQUIRING PROGRAM GUIDE INFORMATION AND/OR PROVIDING FOR PROGRAM GUIDE NAVIGATION USING SAME" and insert -- PROGRAM GUIDE APPARATUS --, therefor.

In the Specification

Column 1, Cross Reference and Related Application, Line 14, Delete "Industrial" and insert -- Intellectual --, therefor.

Signed and Sealed this
Twenty-fifth Day of August, 2015

Michelle K. Lee
*Director of the United States Patent and Trademark Office*